3,290,364
N,N-DI-LOWER ALKYLHYDROXYLAMINE SALTS OF POLYCARBOXYLIC ACIDS
Harry Elmer Albert, Lafayette Hill, Pa., assignor to Pennsalt Chemicals Corporation, Philadelphia, Pa., a corporation of Pennsylvania
No Drawing. Filed Oct. 30, 1963, Ser. No. 319,961
6 Claims. (Cl. 260—501)

This invention relates to the stabilization of aromatic vinyl compounds with a novel class of compounds and to the stabilized compositions obtained.

It is known that aromatic vinyl compounds such as styrene, divinylbenzene, alpha methyl styrene and the like, tend to polymerize on standing, and numerous inhibitors have been employed heretofore to prevent this premature polymerization. Among the inhibitors previously used have been N,N-dialkylhydroxylamines and their simple inorganic salts, as, for example, the hydrochloride and sulfate, and such technology is taught in U.S. Patents 2,965,685; 2,225,471, and 2,318,212. It has now been found, however, that a surprising improvement in the techniques of stabilizing aromatic vinyl compounds can be achieved by employing as stabilizers N,N-di-lower alkylhydroxylamine salts of hydroxy acids and polycarboxylic acids which have the structural formula

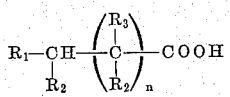

where $R_1$ is a member selected from the group of methyl and carboxyl, $R_2$ is a member selected from the group of hydrogen and hydroxyl, $R_3$ is a member selected from the group of hydrogen and carboxyl, $n$ is an integer from 0 to 8 and with the proviso that when $R_1$ is methyl at least one $R_2$ is hydroxyl.

It is surprising that the N,N-dialkylhydroxylamine salts of acids of the above structure are operable as stabilizers. Aromatic carboxylic acid salts (e.g. benzoates, salicylates, etc.) are inoperable as stabilizers for aromatic vinyl compounds even though they have inherent mutual solubility and compatibility with aromatic vinyl compounds. Furthermore, not all polycarboxylic acid salts of N,N-dialkylhydroxylamines show the superior stabilizing effects obtained with the acids of this invention. The oxalate salts of N,N-di-lower alkylhydroxylamines, for example, are equivalent to the use of the N,N-di-lower alkylhydroxylamines alone and fall short of the inhibiting activity of the acid salts given above. Also, the olefinic carboxylic acid salts (e.g. maleic acid salts) are not operable as stabilizers for vinyl monomers.

It will be understood in discussing this invention that the acid salts used may be those of any N,N-di-lower alkylhydroxylamine, i.e., a hydroxylamine having attached to the nitrogen atom two alkyl groups containing from one to 6 carbon atoms in each alkyl group; e.g., N,N-dimethylhydroxylamine; N,N-diethylhydroxylamine; N,N-dipropylhydroxylamine; N,N - diisopropylhydroxylamine; N,N-diamylhydroxylamine; N,N-n-propylmethylhydroxylamine; N,N-ethylmethylhydroxylamine; N,N-butylmethylhydroxylamine; N,N-dihexylhydroxylamine and the like. Likewise, it will be understood that the N,N-dialkylhydroxylamine salts of the invention may be employed with vinyl compounds such as styrene, divinylbenzene, -methylstyrene, ring methylated styrene, ethylvinylbenzene, vinylnaphthalene, ring chlorinated styrenes, etc., although styrene will be used throughout the specification to illustrate the invention.

The N,N-di-lower alkylhydroxylamine salts useful in the stabilizing process of this invention are novel compounds and the mono salts will have the structural formula:

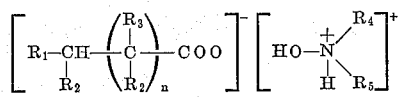

where $R_1$, $R_2$, $R_3$, and $n$ are defined above and $R_4$ and $R_5$ are alkyl groups containing from 1 to 6 carbon atoms. Examples of the acid salts of the N,N-di-lower alkylhydroxylamines include the lactates, tartrates, citrates, malates, malonates, succinates, glutarates, adipates, pimelates, sebacates, azelates, and the like. It will be understood that the operable salts will include those containing one or more moles of N,N-dialkylhydroxylamine per mole of polycarboxylic acid.

When used in the process of the invention to inhibit the premature polymerization of the vinyl compounds, the compounds will be used preferably at a concentration of about 0.1 to 2% by weight of the vinyl compound. However, it is to be understood that lower concentrations may also be employed, as well as higher concentrations, and the general operable range will vary from between about 0.001 to 5% by weight of the vinyl compounds to be stabilized.

The salts are prepared readily by the addition of an organic solvent solution of the di-lower alkylhydroxylamine to an organic solvent solution of the carboxylic acid, although in some instances, particularly with the higher molecular weight acids, highly concentrated aqueous solutions of the hydroxylamine are simply mixed with the acid. The resulting salt which forms, may be filtered off if it precipitates from solution, or it may be isolated by the usual techniques of organic chemistry. The following examples illustrate the preparation of these novel N,N-di-lower alkylhydroxylamine salts:

EXAMPLE 1.—DIETHYLHYROXYLAMMONIUM CITRATE

A solution of 5.25 g. (0.025 mole) of citric acid in 250 ml. of ethyl ether plus 50 ml. of isopropyl alcohol was prepared and to this a solution of 7.60 g. of 88% diethylhydroxylamine (diethylhydroxylamine content of 6.70 g.=0.075 mole) in 125 ml. of ether was added. An oil separated which crystallized to a fine white powder. This was filtered and dried in a desiccator over solid KOH. The product weighed 6.0 g. (85% yield for monobasic salt); M.P. 130° C. (decomposition). Analysis gave 4.94% nitrogen, the theoretical value being 4.98%.

EXAMPLE 2.—BIS(DIETHYLHYDROXYL-AMMONIUM) TARTRATE

Fifteen grams (0.1 mole) of tartaric acid was added to 19.6 g. (0.2 mole) of 93% diethylhydroxylamine. The addition of 5 ml. of water was necessary to completely effect solution. This was heated and chilled to cause the separation of a yellow waxy solid. After two recrystallizations from isopropyl alcohol the melting point was 111–114° C. and the product weighed 16.6 g. This analyzed 8.86% nitrogen and 57.60% diethylhydroxylamine. The theoretrical values are 8.54% nitrogen and 54.20% diethylhydroxylamine.

EXAMPLE 3.—BIS(DIETHYLHYDROXYL-AMMONIUM) ADIPATE

At room temperature, 9.2 g. (0.1 mole) of 92.8% diethylhydroxylamine was stirred with 7.3 g. (0.05 mole) of adipic acid. On warming slightly, a homogeneous dark amber oil was obtained. This product was soluble in acetone, diacetone alcohol, xylene and water.

EXAMPLE 4.—DIETHYLHYDROXYL-AMMONIUM LACTATE

At room temperature, 10.6 g. (0.1 mole) of 85% lactic acid was dissolved in 9.6 g. (0.1 mole) of 93% diethylhydroxylamine. The resulting solution was warmed and then placed in a vacuum dessicator over $P_2O_5$ for 5 days. The liquid product weighed 13.8 g. (77% yield).

EXAMPLE 5.—BIS(DIETHYLHYDROXYL-AMMONIUM) SUCCINATE

A mixture of 9.2 g. (0.1 mole) of 92.6% diethylhydroxylamine and 5.9 g. (0.005 mole) of succinic acid was stirred and warmed until the acid was dissolved. The product was an orange oil which was soluble in water, xylene, acetone and diacetone alcohol.

In using the above salts as polymerization inhibitors they may be dissolved in uninhibited vinyl monomer to prepare a concentrate containing 5 to 10% of inhibitor, aliquots of which are then used as desired by adding to the monomer to be stabilized. Such techniques make for ease of handling and are conducive to a highly efficient stabilizing procedure.

In order to further illustrate the effectiveness of the invention, the following examples are given:

EXAMPLE 6

The polymerization of styrene containing N,N-dialkylhydroxylamine and a control of styrene containing no inhibitor was studied simultaneously by means of dilatometric experiments. The dilatometer employed was of the stopcock type with a bulk of 25 ml. capacity and a 80 cm. capillary stem of 2.0 mm. bore. The open capillary top was plugged with a small glass bead to eliminate any evaporation of the monomer. In order to insure that it was free of inhibitor and any impurities, the styrene employed was distilled and maintained under refrigeration prior to polymerization. The styrene charge was drawn into the dilatometer by suction through a tube extending below the bottom of the styrene. The dilatometer was then placed in a mineral oil bath so that the bulb and 5 cm. of the capillary stem was submerged below the oil level. The oil bath was then heated to raise the temperature of the styrene to $120 \pm 0.2°$ C. Approximately 15 minutes were required for the solution to reach thermal equilibrium upon immersion of the dilatometer in the thermostatically-controlled bath.

Initially upon heating, the volume of the styrene in the capillary tube rises to a given level. Thereafter, as polymerization begins and continues, the level of the liquid in the capillary tube progressively falls. Thus, the decrease in volume of the liquid in the capillary tube provides a direct measure of the amount of polymerization which is occurring, the smaller the decrease, the greater the inhibition. The following tables indicate the compounds tested and the results obtained.

Table I
STABILIZATION EFFECTS OF 0.5% BY WEIGHT OF N,N-DIETHYLHYDROXYLAMINE SALTS ON STYRENE

| | Decrease in height in 2 Hrs. at 120° C. | |
|---|---|---|
| | Cm. | Percent of control |
| A | | |
| Control | 26.5 | |
| Diethylhydroxylamine | 4.2 | 15.8 |
| Diethylhydroxylamine sulfate | 12.0 | 43.0 |
| Diethylhydroxylamine bis-tartrate | 2.2 | 8.3 |
| Diethylhydroxylamine bis-adipate | 1.4 | 5.3 |
| B | | |
| Control | 26.7 | |
| Diethylhydroxylamine | 2.4 | 9.0 |
| Diethylhydroxylamine bis-succinate | 1.2 | 4.5 |
| Diethylhydroxylamine lactate | 0.8 | 3.0 |
| Diethylhydroxylamine oxalate | 3.5 | 13.0 |
| Diethylhydroxylamine maleate | 23.6 | 88.4 |
| C | | |
| Control | 39.8 | |
| Diethylhydroxylamine | 6.2 | 15.6 |
| Diethylhydroxylamine hydrochloride | 7.0 | 17.6 |
| Diethylhydroxylamine benzoate | 30.0 | 75.4 |
| Diethylhydroxylamine salicylate | 18.2 | 45.7 |
| Diethylhydroxylamine citrate | 2.5 | 6.3 |

It is evident from the above Table I that the acid salts of N,N-di-lower alkylhydroxylamines are markedly superior polymerization inhibitors than the diethylhydroxylamine, its hydrochloride, its aromatic carboxylic acid salts, or the oxalates and maleates.

EXAMPLE 7

The evaluation procedure of Example 1 was repeated using bis-dibutylhydroxylamine sebacate at a concentration of 0.5% by weight of the styrene. The polymerization of the styrene was greatly inhibited.

It will be understood that numerous changes and variations may be made from the above description and examples without departing from the spirit and scope of the invention.

I claim:

1. N,N-di-lower alkylhydroxylamine salts of an acid having the structural formula

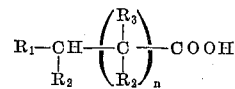

where $R_1$ is a member selected from the group consisting of methyl and carboxyl, $R_2$ is a member of the group consisting of hydrogen and hydroxyl, $R_3$ is a member of the group consisting of hydrogen and carboxyl, $n$ is an integer from 0 to 8, and with the proviso that when $R_1$ is methyl at least one $R_2$ is hydroxyl.

2. N,N-diethylhydroxylamine lactate.
3. N,N-diethylhydroxylamine tartrate.
4. N,N-diethylhydroxylamine citrate.
5. N,N-diethylhydroxylamine adipate.
6. N,N-diethylhydroxylamine succinate.

References Cited by the Examiner

UNITED STATES PATENTS 2,965,685   12/1960   Campbell _____ 260—666.5

LORRAINE A. WEINBERGER, *Primary Examiner.*

M. WEBSTER, *Assistant Examiner.*